United States Patent [19]

Hochstrasser

[11] Patent Number: 5,095,944
[45] Date of Patent: Mar. 17, 1992

[54] SANITARY FITTINGS

[75] Inventor: Ferdinand Hochstrasser, Bundtenweg, Switzerland

[73] Assignee: KWC AG, Hauptstrasse, Switzerland

[21] Appl. No.: 620,789

[22] Filed: Nov. 30, 1990

[30] Foreign Application Priority Data

Dec. 13, 1989 [CH] Switzerland .................. 4482/89

[51] Int. Cl.$^5$ ........................................... F16K 11/14
[52] U.S. Cl. ..................... 137/607; 137/595; 251/38
[58] Field of Search ...................... 137/606, 607, 595; 251/65, 38

[56] References Cited

U.S. PATENT DOCUMENTS

| 2,301,439 | 11/1942 | Moen ................................. 137/607 |
| 2,346,904 | 4/1944 | Carlson . |
| 2,496,553 | 2/1950 | Littlefield . |
| 2,616,710 | 11/1952 | Woodruff ...................... 137/607 X |
| 3,178,151 | 4/1965 | Caldwell . |
| 3,181,790 | 5/1965 | Smith . |
| 3,306,570 | 2/1967 | Cooksley . |
| 3,472,277 | 10/1969 | Reinicke . |
| 3,550,901 | 12/1970 | McIntosh . |
| 3,667,722 | 6/1972 | Katz et al. ........................ 251/38 X |
| 3,818,928 | 6/1974 | Carsten . |
| 3,977,436 | 8/1976 | Larner . |
| 4,561,629 | 12/1985 | Idogaki . |
| 4,826,129 | 5/1989 | Fong . |

FOREIGN PATENT DOCUMENTS

| 312781 | 9/1988 | European Pat. Off. . |
| 1775108 | 7/1971 | Fed. Rep. of Germany . |
| 2902410 | 7/1980 | Fed. Rep. of Germany . |
| 2225675 | 4/1973 | France . |
| 2334037 | 12/1975 | France . |
| 2335767 | 9/1976 | France . |
| 2103391 | 2/1983 | United Kingdom . |

Primary Examiner—Stephen M. Hepperle
Attorney, Agent, or Firm—Barnes & Thornburg

[57] ABSTRACT

The fitting has a valve (18) for cold water and a valve for (sic) (20) for hot water. Arranged fixedly on the closure part (38) interacting with the valve seat (42) is the auxiliary valve seat (56) of the relevant auxiliary valve (52, 54). The closure element (58) can be displaced in the direction of the axis (30) from the idle position shown into the desired limiting position by displacement of the control pin (82) in the direction of the axis (78') and by rotation of the same about the axis (78'). The auxiliary valves (52, 54) are thereby opened which leads to a pressure drop in the pilot control space (40). The closure parts (38) are lifted from the valve seats (42), by which means the water can flow from the inlet (22, 22') into the outlet (48, 48'). When the valve (18, 29) is opened, the gap between the O-ring (66) and the auxiliary valve seat (56) thus becomes smaller. This results in a pressure balancing occurring between the pilot control space (40) and the other side of the closure part (38). The quantity of water flowing through a valve (18, 20) is thus determined by the limiting position of the closure element (58). The fitting thus no longer requires a mixing valve, the temperature of the mixed water flowing out through the water outlet head (28) is determined by the quantity of cold and hot water released by the valves (18, 20).

9 Claims, 4 Drawing Sheets

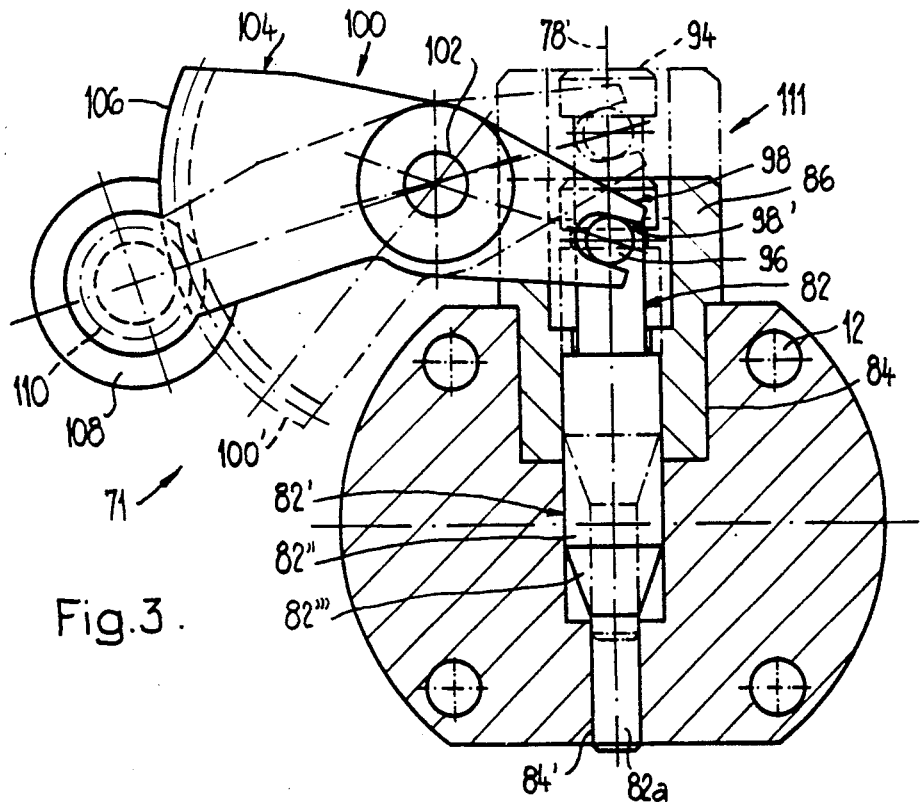
Fig. 3.
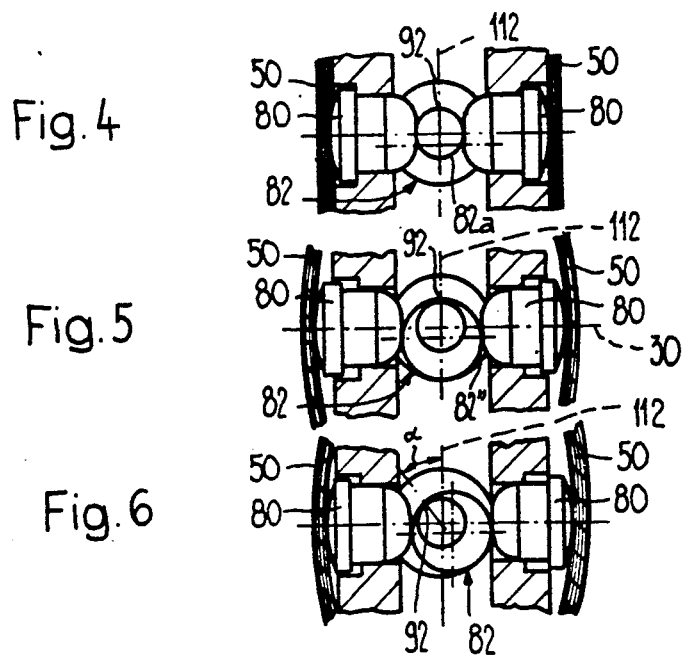
Fig. 4
Fig. 5
Fig. 6

SANITARY FITTINGS

The present invention relates to a sanitary fitting.

Fittings of this type are commercially obtainable. For the hot and cold water respectively, these customarily have a hydraulically operable shutoff valve with an integrated auxiliary valve which is opened in each case by means of a solenoid to open the shutoff valve. To interrupt the water flow, the solenoids are switched off, which causes the auxiliary valves and the shutoff valves actuated by the latter to be closed. The shutoff valves have a diaphragm-shaped closure part which interacts with a stationary annular valve seat. Extending around the valve seat is an annular channel which is open toward the closure part and is connected to the relevant inlet for the hot and cold water respectively. Bordered by the valve seat is an exit opening which opens out via a line into a mixing valve. By means of the mixing valve, the quantity of water flowing through each shutoff valve is adjusted in order to regulate the temperature of the mixed water leaving the fitting through an outlet. With regard to the closure part, a pilot control space is provided on the side located opposite the valve seat which pilot control space is connected in terms of flow to the annular channel via a small passage in the closure part. In the region of the exit opening, the closure part has a control passage which is bounded on the pilot control space side by the auxiliary valve. The cross-section of flow of this control passage is greater than the cross-section of flow of the passage connecting the pilot control space to the annular channel. An auxiliary valve seat bordering the control passage and constructed on the closure part interacts with a plunger-shaped closure element arranged in the pilot control space. When the auxiliary and shutoff valves are closed, the closure element is held resting on the auxiliary valve seat in an idle position by a compression spring provided in the pilot control space. In this space, the pressure in the interior of the pilot control space corresponds to the pressure of the water fed through the relevant inlet as a result of the connection between the annular channel and the pilot control space through the passage. As a result of the difference in surface area of the mutual application of pressure of the diaphragm-shaped closure part in the region of the annular channel or of the pilot control space, the closure part is pressed onto the valve seat. To open the shutoff valve, the closure element is drawn by excitation of the solenoid from the idle position into an open position in which it exposes the control passage. By this means, the pilot control space is connected to the outlet which results in the pressure in the pilot control space dropping. By this means, the closure part is lifted from the valve seat and the water flow from the annular channel into the exit opening is released. When the valve is completely opened and the closure element is held in the open position, the auxiliary valve remains completely opened in order to ensure that the pressure on the pilot control space side is always lower than the pressure on the other side of the closure part in order to hold the shutoff valve reliably completely open. To block the water flow, the solenoid is deenergized so that, under the force of the compression spring, the closure element comes to rest on the auxiliary valve seat which results in the pressure in the pilot control space rising. By this means, the closure part is moved in the direction toward the valve seat until it rests on the latter and blocks the flow of water. In this case, the closure element is held always in contact with the valve seat by the compression spring. This fitting is complex in its design.

It is therefore an object of the present invention to provide a fitting which does not require a device separate from the valve to adjust the quantity of water flowing through the valve per unit of time.

According to the invention, the closure element can be brought by means of a drive arrangement into a limiting position between the idle and the open position and retained there. By this measure, the auxiliary valve regulates the pressure automatically in the control circuit in such a way that the valve allows only a quantity of water corresponding to the limiting position to flow through. As a result of the relative movement between the retained closure element and the auxiliary valve seat moved together with the closure part of the valve, the free cross-section between the closure element and the auxiliary valve seat and thus the pressure in the control circuit is regulated depending on the position of the closure part.

In a preferred embodiment, a dynamic seal for a transmission member effectively connected to the closure element is prevented from being permanently under pressure.

A particularly preferred and extremely simple fitting is specified in. A common drive arrangement for both valves requires extremely little energy.

In a particularly preferred embodiment of the fitting, both the temperature of the mixed water and the quantity of the mixed water flowing out can be adjusted by means of a single drive arrangement in a mixing fitting.

Further preferred embodiments of the present invention are specified.

The invention is now described in detail with reference to an exemplary embodiment illustrated in the purely diagrammatic drawing, in which:

FIGS. 2 and 3 show sections through the mixing fitting along the lines II—II and III—III of FIG. 1 respectively.

FIGS. 4 to 6 show an extract from FIG. 2 with different adjustments of the mixing fitting.

FIGS. 1 to 3 show a part of an electrically controlled sanitary mixing fitting. Fittings of this type are customarily used as wash basin fittings.

Figure 1:
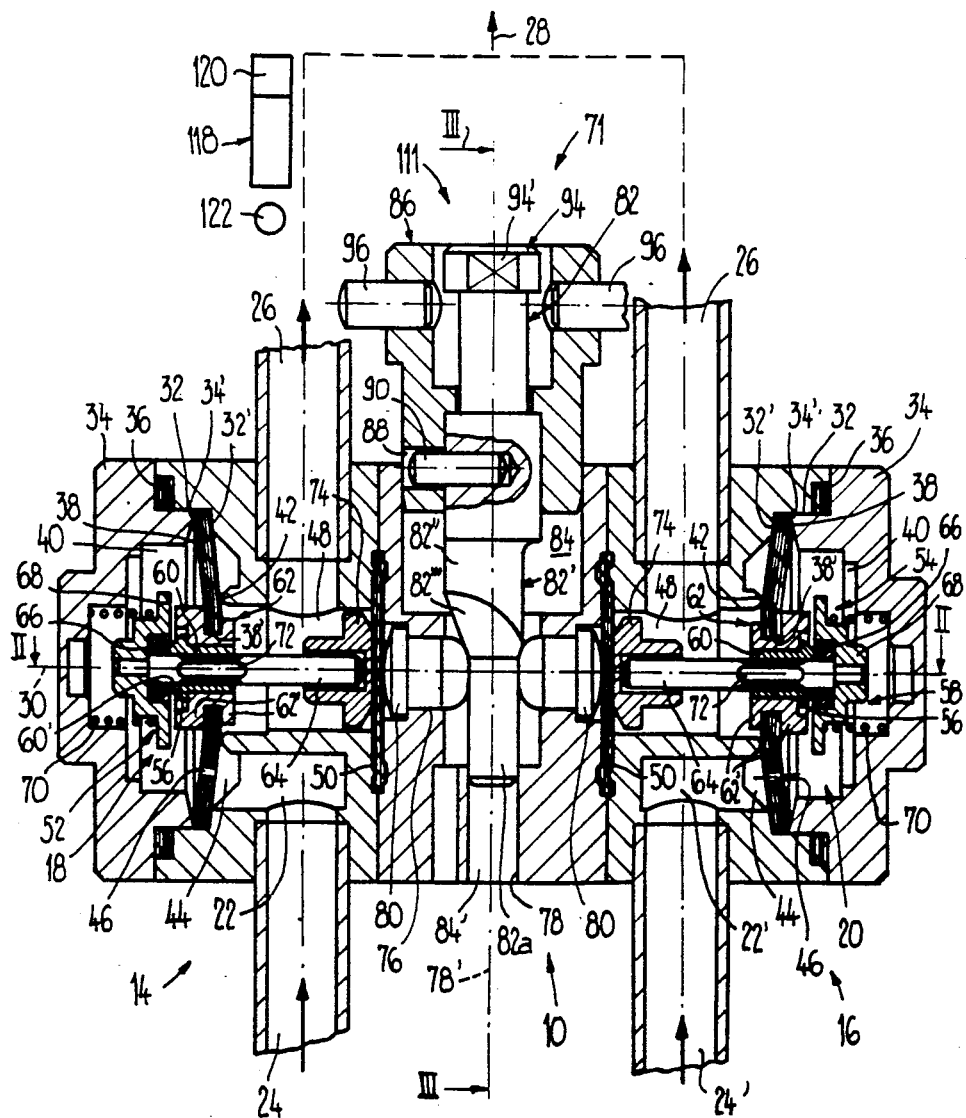
FIG. 1 shows a section through a part of a mixing fitting.

The fitting has a central drive block 10 and two valve blocks 14 and 16 of identical construction which are attached in mirror image to the side of said drive block by means of screws 12. Provided in each valve block 14, 16 is a hydraulically operable valve 18, 20. The valve 18 is connected in terms of flow to an inflow line 24 for cold water via an inlet 22 in the valve block 14 while the other valve 20 is in connection with an inflow line 24' for hot water by a corresponding inlet 22' in the valve block 16. On the outlet side, two valves 18, 20 are connected by means of lines 26 to a common water outlet head 28 which is only indicated diagrammatically (FIG. 1).

Each valve block 14, 16 has a stepped recess 32 which is essentially rotationally symmetrical to the axis 30 of the two valves 18, 20, which recess is closed toward the outside by a hood-shaped lid 34 engaging in the recess 32. The corresponding annular seal arranged between the valve block 14, 16 and the lid 34 is denoted as 36. Provided inside the recess 32 is a diaphragm-shaped closure part 38 overlapping said recess, which closure part consists of rubber elastic material and is held in the circumferential region braced between a shoulder 32' in the recess 32 and the end 34' of the lid 34 engaging in the recess 32. The closure part 38 and the lid 34 bound a pilot control space 40. Provided on the side of the closure part 38 facing away from the pilot control space 40 is an annular valve seat 42 interacting with said closure part, around which valve seat there extends an annular channel 44 which is connected to the relevant inlet 22 or 22' and is open toward the closure part 38. Provided in the closure part 38 is a small passage 46 which connects the pilot control space 40 to the annular channel 42 and thus to the inlet 22, 22'. Seen from the outside, the part of the recess 32 following the valve seat 42 toward the inside and bordered by the valve seat 42 forms an outlet 48 or 48' which opens out into the corresponding lines 26 leading away approximately at right angles to the axis 30. At the end on the drive block side, the recess 32 is bounded by a disk-shaped sealing diaphragm 50 made of rubber elastic material, which is braced at the circumferential region between the drive block 10 and each corresponding valve block 14, 16.

Provided in each pilot control space 40 is an auxiliary valve 52, 54 assigned to the relevant valve 18, 20. Each of these auxiliary valves 52, 54 has an auxiliary valve seat 56 and a closure element 58 interacting with the latter. The auxiliary valve seat 56 is molded onto a hollow cylindrical sleeve 60 which is approximately concentric in relation to the axis 30 and is inserted in an annular reinforcing member 62 which penetrates the diaphragm-shaped closure part 38 in a central opening 38' and is held tightly on said closure part by flanks 62' projecting outward in the radial direction. The pilot control space 40, connected to the inlet 22, 22' by the passage 46, the auxiliary valve 52, 54 and the control passage 60', connected to the outlet 48, 48', form a hydraulic control circuit for the hydraulically operable valves 18, 20.

Extending through the sleeve 60 is an operating pin 64, on which the closure element 58 is fixedly seated in the pilot control space 40. Said closure element has an O-ring 66 which interacts with the auxiliary valve seat 56, which is seated on the operating pin 64 and is gripped along the circumference and on the side facing away from the auxiliary valve seat 56 by a hood-shaped holding part 68 attached to said operating pin. Supported on the holding part 68 is the end of a compression spring 70 which, at the other end, rests on the lid 34 and presses the closure element 58 against the auxiliary valve seat 56. The compression spring 70 is a part of the drive arrangement 71. The cross-section of the operating pin 64 is smaller than the clear width of the sleeve 60 so that there is always a control passage 60' free between the sleeve 60 and the operating pin 64, the cross-sectional surface of said control passage being greater than the passage 46 which connects the annular channel 44 to the pilot control space 40. In the region of the sleeve 60, the operating pin 64 has longitudinal grooves 72 which additionally increase the cross-section of flow between the sleeve 60 and the operating pin 64 after the closure element 58 has been lifted from the auxiliary valve seat 52, 54. When the closure element 58 has been lifted from the auxiliary valve seat 56, the pilot control space 40 is connected in terms of flow to the outlet 48 or 48'. When the O-ring 66 of the closure element 58 is resting on the auxiliary valve seat 56, this connection is interrupted.

Provided between the sealing diaphragm 50 and this end of the operating pin 64 is a plate-shaped transmission element 74 which surrounds the end region of the operating pin 64, is closed toward the sealing diaphragm 50 and, when the sealing diaphragm 50 is deflected, transmits this deflection in the direction toward the valve 18, 20 to the operating pin 64 and the auxiliary valve 52, 54 without impermissible great surface pressing thereby occurring in the sealing diaphragm 50 made of rubber elastic material.

Figure 2:
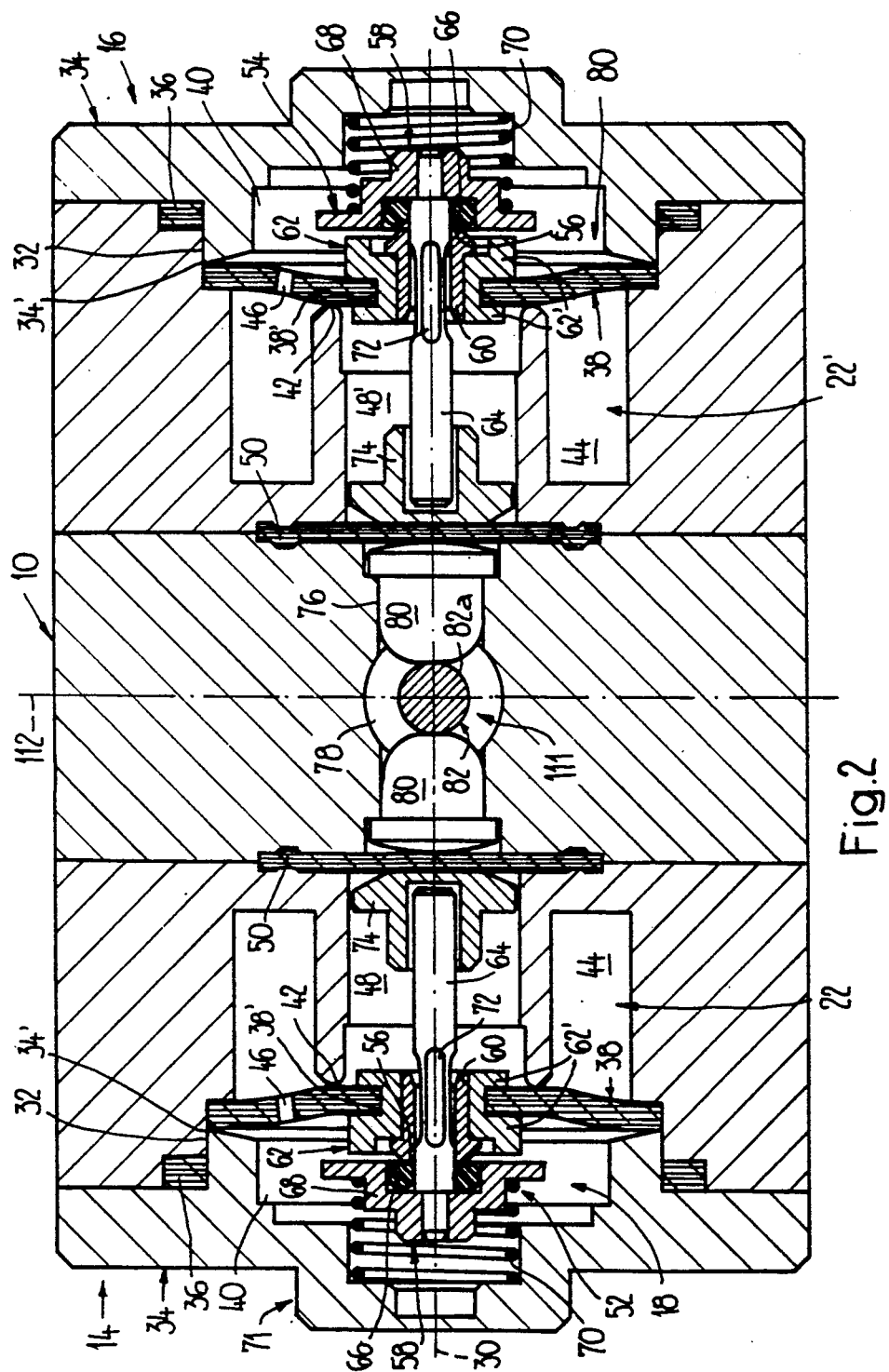

FIGS. 1 and 2 show the closure part 38 resting on the valve seat 42 and the closure element 58 resting on the auxiliary valve seat 58. The valves 18, 20 and auxiliary valve 52, 54 are thus closed. In this case, the closure element 58 is in its idle position.

The drive block 10 has two stepped cylindrical passage openings 76, 78 intersecting at right angles, the passage opening 76 extending concentrically relative to the axis 30 being bounded by the two sealing diaphragms 50. Guided displaceably in the direction of the axis 30 in the passage opening 76 are two guide shoes which each rest at one end on a sealing diaphragm 50 and project at the other end into the other passage opening 78. At their axial ends, the two guide shoes 80 are of convex shape in order, on the one hand, to load the sealing diaphragm 50 evenly when it is bent out and, on the other hand, to permit unproblematic sliding on a control pin 82 engaging in the passage opening 78.

The axis 78, of the rotationally symmetrical, stepped passage opening 78 is perpendicular to the axis 30 and the control pin 82 is mounted rotatably about this axis 78' and displaceably in the direction of this axis 78'. A guide sleeve 86 is guided displaceably in the direction of the axis 78' in a part 84 of the passage opening 78 with the greatest clear width shown in FIGS. 1 and 3 above the two guide shoes 80. The control pin 82 guided through the guide sleeve 86 is mounted on said guide sleeve fixedly against displacement in the direction of the axis 78' but rotatably by approximately 180° about the axis 78. For this purpose, the guide sleeve 86 has a slot 88 running in the circumferential direction and extending over approximately 180°, in which slot a bolt 90 is guided which is anchored in the control pin 82 and extends in the radial direction.

With the cylindrical end region 82a remote from the guide sleeve 86, the control pin 82 engages in a further part 84' with the smallest clear width of the passage opening 78 arranged below the guide shoes 80 and is guided rotatably in said passage opening and displaceably in the direction of the axis 78'. In the region between this end region 82a which is concentric relative to the axis 78' and the guide sleeve 86, the central region 82' of the control pin 82 is not of rotationally symmetrical construction relative to the axis 78'. This central part 82' has a cylindrical region 82" which is, however, eccentric relative to the axis 78', and a transition region 82'" which connects the part 82" to the end region 82a in the form of an oblique cone. In this case, the cylindrical, eccentric part 82" is constructed in relation to the end region 82a of smaller diameter in such a way that they have a common contour which is straight and extends parallel to the axis 78'. This contour is denoted as 92 in FIGS. 4 to 6. The surface of the control pin 82 in the central region 82' and the end region 82a forms a control surface for the guide shoes 80.

At the top end on the guide sleeve side, the control pin 82 has a head 94, onto which engagement surfaces 94' are molded in order to rotate the control pin 82 into the desired position by means of a corresponding operating grip (not illustrated).

Inserted in the guide sleeve 86 are two diametrically opposite carrier bolts 96 projecting over the guide sleeve 86 in the radial direction. As can be seen in particular from FIG. 3, the guide sleeve 86 is gripped in its upper end region by a forked arm 98 of a two-arm drive lever 100. In the free end regions, the forked arm 98 has slots 98' which are penetrated by the carrier bolts 96. The drive lever 100 is mounted in a swivelling manner on a shaft 102 extending at right angles to the axis 78' and has on its other arm 104 a tooth segment 106 which is concentric relative to the shaft 102 and meshes with a pinion 110 driven by a drive motor 108. The drive lever 100 can be swivelled by means of the drive motor 108 from an idle position 100', shown by dot-dashed lines, into an operating position, illustrated by uninterrupted lines, and back again. During this movement, the transmission sleeve 74 moves together with the control pin 82 in the direction of the axis 78' from the corresponding idle position, likewise indicated by dot-dashed lines, into a corresponding operating position, indicated by uninterrupted lines, and back again.

The guide shoes 80, the control pin 82, the guide sleeve 86, the drive lever 100, the pinion 110 and the drive motor 108 form a drive part 111 of the drive arrangement 71.

In FIGS. 4 to 6, a part of the drive block 10 is illustrated in three different positions of the control pin 82. In the position shown in FIG. 4, the control pin 82 is in its upper idle position indicated by dot-dashed lines in FIG. 3. In this case, the guide shoes 80 rest on the end region 82a of the control pin 82 which is concentric relative to the axis 78'. Neither sealing diaphragm 50 is bent outward. In this position of the control pin 82 and this position of the guide shoes 80, the valves 18, 20 and auxiliary valves 52, 54 are closed as is illustrated in FIGS. 1 and 2.

In FIG. 5, the control pin 82 is in its lower end position shown by uninterrupted lines in FIG. 3. In this case, the guide shoes 80 rest on the cylindrical part 82" which is eccentric relative to the axis 78'. Since the contour 92 is in a plane 112 perpendicular to the axis 30, in which plane the axis 78' of the control pin 82 also lies, the two guide shoes 80 are situated by the same distance in the direction of the axis 30 further away from the plane 112 than in FIG. 4. The sealing diaphragms 50 are bent outward in mirror image by the same amount.

In FIG. 6, the control pin 82 is likewise in its lower operating position. However, the contour 92 is rotated in counterclockwise direction out of the plane 112 by the angle α. This now results in the guide shoe 80, illustrated on the left of FIG. 6, being situated in an intermediate position between the two positions shown in FIGS. 4 and 5. In contrast, the guide shoe 80, shown on the right of FIG. 6, is lifted even further in the direction of the axis 30 compared with FIG. 5.

Figure 7:
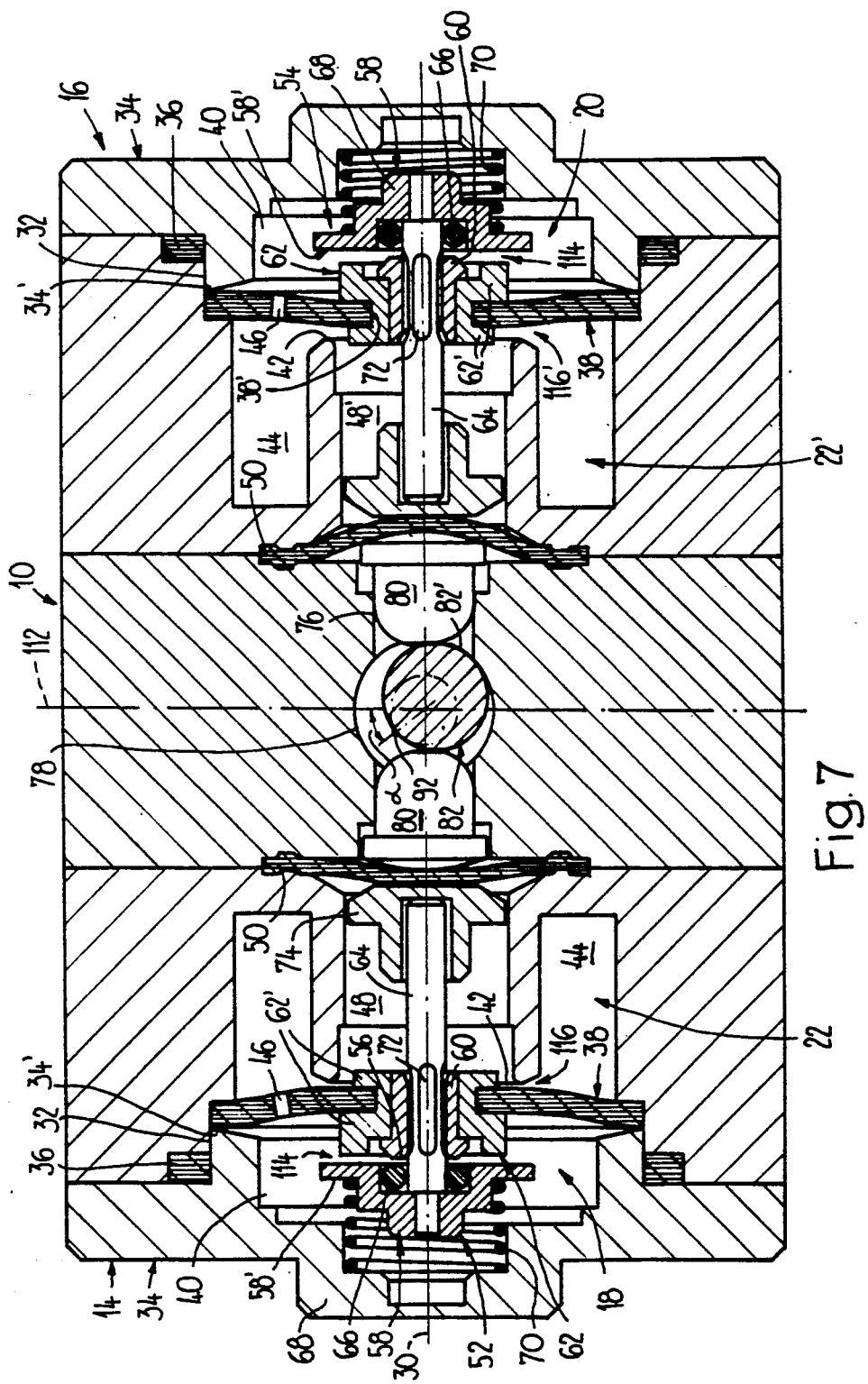
FIG. 7 shows a section through the mixing fitting according to FIG. 2 with an adjustment according to FIG. 6.

FIG. 7 shows the fitting in the same section as FIG. 2, but with the control pin 82 in a position according to FIG. 6. The guide shoe 80, illustrated on the left of FIGS. 6 and 7, is slightly raised by rotation of the control pin 82, whereas the guide shoe 80 illustrated on the right is deflected further in the direction of the axis 30. The lift of the guide shoes 80 in the direction of the axis 30 is transmitted by the sealing diaphragms 50 to the transmission elements 74 and, by the latter, via the operating pin 64 to the relevant closure element 58 so that the two closure elements 58 are situated in two different limiting positions 58' as shown in FIG. 7. In these limiting positions 58', the closure element 58 is thus lifted corresponding to the lift and the position of rotation of the control pin 82 in relation to the idle position, in which the closure element 58 rests on the auxiliary valve seat 56 in the closed valve 18 or 20. Shown between the O-ring 66 and the auxiliary valve seat 56 is a gap denoted as 114, by means of which the pilot control space 40 is connected to the relevant outlet 48 or 48'. The cross-section of flow between the O-rings 66 and the corresponding auxiliary valve seats 56 corresponds approximately to the cross-section of the passages 46 which connect the pilot control spaces 40 to the corresponding inlets 22 or 22'. The two closure parts 38 of the valves 18, 20 are lifted from the corresponding valve seats 42 and expose an outflow gap denoted as 116 or 116', through which the inlets 22, 22' are connected to the outlets 48, 48'. The outflow gap 116 of the valve 18 assigned to the cold water is narrower than the outflow gap 116' of the valve 20 assigned to the hot water. The two valves 18, 20 are thus partially opened corresponding to the displacement of the two guide shoes 80 in the direction of the axis 30 toward the outside and thus in accordance with the limiting position 58' of the closure elements 58.

For reasons of completeness, it should be mentioned that the fitting shown in FIGS. 1 to 7 has an electronic control 118, illustrated diagrammatically in FIG. 1, with a sensor 120. The control 118 is fed by a battery 122 and controls the drive motor 108 shown in FIG. 3. The sensor 120 detects when hands to be washed are in the region of the wash basin or of the water outlet head 118.

If the control pin 82 were rotated counterclockwise by 90° in relation to the plane 112, the closure element 58 of the auxiliary valve 54 illustrated on the right of FIG. 7 would be lifted into the open position in which the valve 20 would be completely opened.

The fitting described above functions as follows. If there are no hands to be washed in the range of detection of the sensor 120, the drive lever 100 is in the idle position 110' indicated by dot-dashed lines in FIG. 3. In this case, the control pin 82 is lifted into the idle position shown in FIGS. 1 to 4. The guide shoes 80 rest on the end region 82a of the control pin 82. The auxiliary valves 52, 54 and valves 18, 20 are closed. The closure elements 58 are in the idle position.

As a result of the connection through the passage 46 to the annular channel 44, the pressure in the pilot control spaces 40 corresponds to the pressure of the water in the relevant inlet 22 or 22'. The closure part 38 is pressed against the valve seat 42 with a force which is proportional to the difference between the pressure in the pilot control space 40 and the outlet 48, 48' and to the difference between the surfaces of the closure part 38 to which pressure is applied in the region of the annular channel 44 and the pilot control space 40. Also added to this force proportional to the water pressure is the force of compression spring 70 which likewise acts on the closure part 38 via the closure element 58. This compression spring 70 thus presses the closure element 58 against the auxiliary valve seat 56, which closure element is additionally pressed onto the auxiliary valve seat 56 with a force which is proportional to the surface bounded by the auxiliary valve seat 56 and the difference between the pressure in the pilot control space 40 and the outlet 48, 48'. It should be noted in this case that the free end of the operating pin 64 is spaced slightly apart from the transmission sleeve 74 in order to ensure that the O-ring 66 rests on the auxiliary valve seat 56 in the idle position of the closure element 58. The outlets 48, 48' are connected with the surroundings via the lines 26 and the water outlet head 28 so that the pressure on the outlet side corresponds to the surrounding pressure when the valves 18, 20 are closed.

If hands to be washed are now brought into the range of detection of the sensor 120, the electronic control 118 operates the drive motor 108 until the drive lever 110 has been swivelled into the operating position illustrated by uninterrupted lines in FIG. 3. The control pin 82 is thereby brought into the lower end position illustrated by uninterrupted lines in FIGS. 3, 5 and 6. This now results in the closure elements 58 being lifted out of the idle position into the limiting position 58' corresponding to the position of rotation α of the control pin 82. The two auxiliary valves 52, 54 thereby open which results in the pilot control spaces 40 now being connected in terms of flow to the outlets 22, 22'. Since the free cross-section of flow in the control passage 60' between the sleeve 60 and the operating pin 64 is greater than the free cross-section of the passage 46, the pressure in the pilot control spaces 40 now sinks which results in the closure parts 38 being lifted from the corresponding valve seats 42. The flow from the annular channels 44 through the outflow gaps 116, 116' into the outlets 48, 48' is thereby released. Due to the movement of the closure parts 38 in the direction toward the closure elements 58, which are situated in the limiting position 58' and are retained there by the compression spring 70 and the drive part 111, results in the gap 114 between the auxiliary valve seats 56 and the O-rings 66 decreasing. As soon as the free cross-section of flow in the gap 114 is now approximately the same size as the cross-section of the passages 46, the pressure in the pilot control space 40 and on the other side of the closure part 38 evens out so that the closure part 38 is held in a self-regulating manner whilst containing a small gap 114 in a position predetermined by the closure element 58. The quantity of water flowing through the outflow gaps 116, 116' per unit of time is thus predetermined by the limiting position 58' of the closure element 58. The cold and hot water now flowing through the valves 18, 20 is fed through the lines 26 to the common water outlet head 28 where the hot and cold water is mixed and runs out of the water outlet head 28 as mixed water. The position of rotation α of the control pin 82 thus determines approximately in mirror image the quantity of cold water and hot water flowing through each valve 18, 20 per unit of time, by which means the temperature of the mixed water is determined. The temperature of the mixed water can thus be adjusted by corresponding rotation of the control pin 82.

If the washed hands are now taken out of the range of detection of the sensor 120, the control 118 feeds the drive motor 108 in such a way that the latter again swivels the drive lever 100 into the idle position 100' illustrated by dot-dashed lines in FIG. 3. The control pin 82 is thereby pulled into the upper end position which results in the lower end region 82a coming to rest in the region of the guide shoes 80. The closure elements 58 are thus no longer held in their limiting position 58' by the control pin 82 against the force of the compression spring 70 which results in the closure elements 58 coming to rest on the auxiliary valve seats 56 by the force of the compression springs 70. The auxiliary valves 52, 54 are closed. Since the connection between the pilot control space 40 and the outlet 48, 48' is now interrupted, the pressure in the pilot control space 40 rises slowly, by which means the closure part 38 is moved toward the valve seats 42 whilst reducing the outflow gaps 116, 116' and finally brought to rest on said valve seats. The valves 18, 20 are closed. The compression spring 70 ensures that, on this movement of the closure part 38, the closure element 58 remains resting on the auxiliary valve seat 56 and additionally supports the movement of the closure part 38 in the direction toward the valve seats 42.

If the contour 92 is thus in the region of the plane 112, that is to say in the centre between two guide shoes 80, both valves 18, 20 are opened to the same extent which results in an equal amount of cold and hot water being able to flow through the corresponding valves 18, 20. The temperature of the mixed water then corresponds to the mean value between the temperature of the cold and hot water. If, in contrast, the control pin 82 is swivelled by the angle α, as shown in FIG. 6 and 7, the valve 18 for cold water is opened less and the valve 20 for hot water is opened more which results in the temperature of mixed water being higher. In this case, however, the total amount of water of the mixed water flowing out per unit of time remains approximately the same independent of the position of rotation of the control pin 82. If the contour 92 is now swivelled into the region of the one or the other guide shoe 80, by rotation of the control pin 82, this results in the relevant guide shoe 80 not being displaced in the direction of the axis 30 when the control pin 82 is displaced in the direction of the axis 78'. The relevant valve 18, 20 thus remains closed. However, the other valve 20 or 18 is fully opened. In this case, the relevant closure element 58 is in the open position.

In the fitting shown in the figures, the desired temperature of the mixed water is thus adjusted by swivelling the control pin 82. Mixed water of the appropriate temperature then flows out of the fitting as long as hands to be washed are in the range of detection of the sensor 120. Of course, the control pin 82 can be connected, for example, to a rotary knob in order to select the temperature of the mixed water individually by rotating the control pin 82. It is also conceivable to construct the electronic control 118 in such a way that, when it is swivelled out of the idle position indicated by dot-dashed lines in FIG. 3 in the direction toward the operating position shown by uninterrupted lines, the drive lever 100 is swivelled into an intermediate position and held there. This results in the guide shoes 80 coming to rest on the control pin 82 in the transition region 82'''. The quantity of mixed water flowing out per unit of time is thus reduced, but the temperature of the mixed water still corresponds to the relevant position of rotation of the control pin 82.

It is also conceivable to construct the fitting as a one-hand lever mixer. In this case, the control pin 82 is connected fixedly in terms of rotation and in terms of lift to the transmission sleeve 74. The drive lever 100 is then replaced by an operating lever which is mounted on the drive block 110 rotatably about the axis 78' and in a swivelling manner about an axis corresponding to the shaft 102. The desired temperature can then be adjusted by rotation of the operating lever about the shaft 78' and the desired quantity of water by swivelling said operating lever about the horizontal axis.

Furthermore, a fitting can, of course, have only a single valve 18 or 20. In this case, the quantity of water flowing through the valve can be regulated according to the invention.

It is, of course, also conceivable to construct the closure element in the form of a piston.

I claim:

1. A sanitary fitting having at least one hydraulically operable valve arranged between an inlet and an outlet for releasable blocking of a flow of water through the fitting, the hydraulic control circuit of which valve is connected to the inlet and the outlet and has an auxiliary valve with an auxiliary valve seat which is movable together with the closure part of the valve and a closure element interacting with said auxiliary valve seat, it being possible for the closure element of the auxiliary valve to be brought by means of a drive arrangement out of an idle or rest position, in which it rests on the auxiliary valve seat when the valve is closed, for opening the valve into an open position, in which it is lifted from the auxiliary valve seat when the valve is open, and to be brought to rest on said auxiliary valve seat again for closing the valve and to be moved back into the idle position resting on said auxiliary valve seat, wherein the closure part (38) is of diaphragm-shaped or piston-shaped construction and interacts with a valve seat (42) arranged on the one side of the closure part (38), wherein, on the other side, a pilot control space (40) is provided which is connected to the inlet (22, 22') and can be connected via the auxiliary valve (52, 54) to the outlet (48, 48') and separated from the latter, in which pilot control space there is arranged the closure element (58) interacting with the auxiliary valve seat (56) arranged on the closure part (38) and in effective connection by means of a transmission member (64) with a drive part (111) of the drive arrangement (71), wherein the closure part (38) has a control passage (60') which is connected to the outlet (48, 48') and bounded by the auxiliary valve (52, 54) on the pilot control space side, wherein the transmission member (64) is passed through the control passage (60'), and wherein the valve seat (42) is of annular construction and bounds an outflow path connected to the outlet (48, 48'), the wall of which outflow path has in the region of this end of the transmission member (64) a diaphragm-shaped wall part (50) which can be deflected to actuate the auxiliary valve (52, 54) from the side opposite the transmission member (64) acting on the latter.

2. The fitting as claimed in claim 1, wherein the drive arrangement (71) has a spring element (70) prestressing the closure element (58) in the direction toward the auxiliary valve seat (56) and the closure element (58) is displaceable against the force of the spring element (70) by means of the drive part (111).

3. The fitting as claimed in claim 1, wherein the drive part (111) has a guide shoe (80) which is located opposite the transmission member (64) relative to the wall part (50), is displaceable in the operating direction (30) of the transmission member (64) and interacts with a control cam arrangement (82).

4. The fitting as claimed in claim 1, which has two valves (18, 20) each connected to an inlet (22, 22') for the cold and the hot water and to the outlet (48, 48') for releasable blocking of the relevant cold and hot water flow and a common drive arrangement (71) for both valves.

5. The fitting as claimed in claim 4, wherein the two valves (18, 20) are arranged symmetrically to each other with transmission members (64) directed toward each other and can be actuated by means of a common control cam arrangement (82).

6. The fitting as claimed in claim 5, wherein the control cam arrangement has a control shaft (82) which extends approximately at right angles to the operating direction (30) of the transmission members (64) and is displaceable in the direction of its longitudinal axis (78'), on which control shaft a preferably conical control surface (82''') is formed for displacing the closure elements (58).

7. The fitting as claimed in claim 6, wherein the control shaft (82) can be rotated about its longitudinal axis, (78') and the control surface (82') is of asymmetrical construction in relation to this longitudinal axis (78') in order to adjust the temperature of the mixed water flowing through the outlet (28) by rotating the control shaft (82) and to adjust the outflowing quantity of the mixed water by displacing the control shaft (82).

8. The fitting as claimed in claim 1 having a device for adjusting the quantity of water flowing through the valve per unit of time, wherein the closure element (58) can be brought by means of the drive arrangement (71) into a limiting position (58') between the idle and the open positions and retained there for only partial opening of the valve (18, 20) corresponding to the desired quantity of water flowing per unit of time.

9. The fitting as claimed in claim 8, wherein the limiting position (58') is infinitely adjustable between the idle position and the open position.

* * * * *